(12) United States Patent
Hecht et al.

(10) Patent No.: US 8,266,608 B2
(45) Date of Patent: *Sep. 11, 2012

(54) POST-COMPILE INSTRUMENTATION OF OBJECT CODE FOR GENERATING EXECUTION TRACE DATA

(75) Inventors: Daniel Michael Hecht, Los Altos, CA (US); Michael Lindahl, Santa Barbara, CA (US); David Kleidermacher, Goleta, CA (US)

(73) Assignee: Green Hills Software, Inc., Santa Barbara, CA (US)

( * ) Notice: Subject to any disclaimer, the term of this patent is extended or adjusted under 35 U.S.C. 154(b) by 1568 days.

This patent is subject to a terminal disclaimer.

(21) Appl. No.: 11/463,854

(22) Filed: Aug. 10, 2006

(65) Prior Publication Data

US 2007/0006159 A1      Jan. 4, 2007

Related U.S. Application Data

(63) Continuation-in-part of application No. 11/061,086, filed on Feb. 18, 2005.

(51) Int. Cl.
*G06F 9/44* (2006.01)
*G06F 9/45* (2006.01)
*G06F 11/00* (2006.01)

(52) U.S. Cl. ........ 717/158; 717/128; 717/130; 717/135; 717/140; 717/151; 714/35

(58) Field of Classification Search ............ None
See application file for complete search history.

(56) References Cited

U.S. PATENT DOCUMENTS

| | | |
|---|---|---|
| 5,287,510 A | 2/1994 | Hall et al. |
| 5,694,539 A * | 12/1997 | Haley et al. ........... 717/135 |
| 5,748,878 A | 5/1998 | Rees et al. |
| 5,790,858 A | 8/1998 | Vogel |
| 6,047,390 A | 4/2000 | Butt et al. |
| 6,106,571 A | 8/2000 | Maxwell |
| 6,145,121 A * | 11/2000 | Levy et al. ........... 717/135 |
| 6,161,200 A | 12/2000 | Rees et al. |
| 6,161,216 A | 12/2000 | Shagam |
| 6,202,199 B1 | 3/2001 | Wygodny et al. |
| 6,311,326 B1 | 10/2001 | Shagam |

(Continued)

OTHER PUBLICATIONS

Han Bok Lee and Benjamin G. Zorn, BIT: A Tool for Instrumenting Java Bytecodes, 1997 [online], retrieved on May 3, 2012, pp. 1-10. Retrieved from the Internet: <URL: http://research.microsoft.com/pubs/68169/usits97-bit.pdf>.*

(Continued)

*Primary Examiner* — Thuy Dao
*Assistant Examiner* — Hanh T Bui
(74) *Attorney, Agent, or Firm* — Barcelo, Harrison & Walker LLP (57) ABSTRACT

The invention is directed to instrumenting object code of an application and/or an operating system on a target machine so that execution trace data can be generated, collected, and subsequently analyzed for various purposes, such as debugging and performance. Automatic instrumentation may be performed on an application's object code before, during or after linking. A target machine's operating system's object code can be manually or automatically instrumented. By identifying address space switches and thread switches in the operating system's object code, instrumented code can be inserted at locations that enable the execution trace data to be generated. The instrumentation of the operating system and application can enable visibility of total system behavior by enabling generation of trace information sufficient to reconstruct address space switches and context switches.

23 Claims, 9 Drawing Sheets

U.S. PATENT DOCUMENTS

| | | | |
|---|---|---|---|
| 6,311,327 B1* | 10/2001 | O'Brien et al. | 714/35 |
| 6,618,824 B1* | 9/2003 | Hastings | 714/35 |
| 6,792,460 B2 | 9/2004 | Oulu et al. | |
| 6,892,379 B2* | 5/2005 | Huang | 717/140 |
| 6,934,935 B1* | 8/2005 | Bennett et al. | 717/151 |
| 6,966,057 B2* | 11/2005 | Lueh | 717/158 |
| 6,968,546 B2* | 11/2005 | Lueh | 717/158 |
| 7,484,205 B2* | 1/2009 | Venkatapathy | 717/158 |
| 7,512,935 B1* | 3/2009 | Cobb | 717/130 |
| 7,536,680 B2* | 5/2009 | Berry et al. | 717/158 |
| 7,721,266 B2* | 5/2010 | Frey et al. | 717/128 |
| 8,042,102 B2* | 10/2011 | DeWitt et al. | 717/128 |
| 8,104,023 B2* | 1/2012 | Cobb | 717/130 |
| 8,136,096 B1* | 3/2012 | Lindahl et al. | 717/135 |
| 2002/0095660 A1* | 7/2002 | O'Brien et al. | 717/128 |
| 2002/0095661 A1* | 7/2002 | Angel et al. | 717/130 |
| 2002/0138788 A1* | 9/2002 | Yenne et al. | 714/38 |
| 2003/0084433 A1* | 5/2003 | Luk et al. | 717/158 |
| 2004/0019886 A1* | 1/2004 | Berent et al. | 717/158 |
| 2004/0031020 A1* | 2/2004 | Berry et al. | 717/130 |
| 2004/0060040 A1* | 3/2004 | Collard | 717/151 |
| 2004/0123279 A1* | 6/2004 | Boykin et al. | 717/158 |

OTHER PUBLICATIONS

Brian Grant et al., The Benefits and Costs of DyC's Run-Time Optimizations, Sep. 2000 [online], retrieved on May 3, 2023, pp. 932-972. Retrieved from the Internet: <URL: http://delivery.acm.org/10.1145/370000/367161/p932-grant.pdf?>.*

Allen Goldberg and Klaus Havelund, Instrumentation of Java Bytecode for Runtime Analysis, 2003 [online], retrieved on May 3, 2012, pp. 1-9. Retrieved from the Internet: <URL: http://citeseerx.ist.psu.edu/viewdoc/summary?doi=10.1.1.154.5240>.*

U.S. Appl. No. 11/061,086, Official Communication mailed Dec. 19, 2008 (24 pages).

US Patent and Trademark Office, Office Communication mailed Sep. 16, 2009 for U.S. Appl. No. 11/061,086, 32 pages.

* cited by examiner

FIG. 5 ated environment;
POST-COMPILE INSTRUMENTATION OF OBJECT CODE FOR GENERATING EXECUTION TRACE DATA

CROSS REFERENCE TO RELATED APPLICATION

The present application is a continuation-in-part of U.S. patent application Ser. No. 11/061,086, filed on Feb. 18, 2005, and which the benefit of the earlier priority date is hereby claimed under 35 U.S.C. §120 and further incorporated herein by reference.

FIELD OF THE INVENTION

The present invention relates generally to computer software development, and more particularly to instrumentation of computer program code to generate trace data during system execution.

BACKGROUND OF THE INVENTION

In any substantial software development project, the identification and correction of bugs and other erroneous or undesirable program behavior is a challenging task. Debugging of software developed for embedded systems is often especially difficult. Program errors may be visible on hardware only in real time, or they may be intermittent and nondeterministic. Conventional debugging tools are typically not an adequate solution for correcting such relatively complex software problems.

Some microprocessor architectures, including certain architectures used for embedded systems, have been designed with high-speed trace ports that facilitate the outputting of cycle-by-cycle trace data about the status of the processor when code is executed. In essence, hardware trace data comprises a complete log of instructions executed by the processor. Trace data may also include information regarding data read from and written to memory, as well as information regarding the occurrence of context switches and operating system interrupts. This information is highly useful for debugging embedded applications and the like by providing visibility. When a system crash occurs, the availability of trace data, coupled with appropriate software tools for trace analysis, enables the developer to reconstruct the program flow to see precisely what the program was doing at the time of the crash.

For many microprocessors, unfortunately, there is no hardware facility that generates trace data. To achieve useful visibility of execution behavior comparable to that provided by way of hardware-generated trace data, developers of applications for non-trace architectures often instrument the code. Instrumentation has certain drawbacks, particularly the accompanying increase in the size and slowdown in the execution speed of programs under development. Existing industry instrumentation solutions have required preprocessing and recompilation of source code in order to insert instrumentation tags. Typically, several instructions are generated for each instrumentation point. For large applications, compile-time or pre-compilation instrumentation entails undesirably long build times and complex management of multiple versions of the software system under development. The debugging process is also adversely affected when code is instrumented at compile time.

Today's microprocessors typically include on-chip memory management units that, given appropriate support from a memory-protected operating system, enable individual threads of execution to run in hardware-protected private virtual address spaces. Memory-protected operating systems improve the reliability of software and facilitate debugging. A potential drawback to existing instrumentation solutions is that they often provide for instrumenting a single execution address space.

BRIEF DESCRIPTION OF THE DRAWINGS

For a better understanding of the present invention, reference will be made to the following detailed description, which is to be read in association with the accompanying drawings, wherein.

DETAILED DESCRIPTION

In the following detailed description, reference is made to the accompanying drawings, in which are shown exemplary but non-limiting and non-exhaustive embodiments of the invention. These embodiments are described in sufficient detail to enable those having skill in the art to practice the invention, and it is understood that other embodiments may be used, and other changes may be made, without departing from the spirit or scope of the invention. The following detailed description is, therefore, not to be taken in a limiting sense, and the scope of the invention is defined only by the appended claims. In the accompanying drawings, like reference numerals refer to like parts throughout the various figures unless otherwise specified.

Briefly stated, the present invention is directed to a method and system for instrumenting the object code of a target machine so that execution trace data can be generated, collected, and subsequently reviewed for debugging and performance analysis. Embodiments of the invention are thus particularly suitable for providing trace capability for microprocessors that are not equipped with trace interfaces and/or ports. In one embodiment, the application's object code is automatically instrumented after compilation of the source code. The automatic instrumentation may be performed by way of a linker itself or by an alternate facility such as an object code analyzer, and like. Automatic instrumentation may also be performed on the object code after linking has occurred.

In one embodiment, the target machine's operating system object code can be manually or automatically instrumented. By identifying address space switches and thread switches in the operating system's object code, instrumented code can be inserted at locations that enable the execution trace data to be generated. The post-compile-time instrumentation of a memory-protected operating system can be provided for a particular target development platform. Typically, a virtual memory mapping technique can be used. Also, the inventive instrumentation of the operating system can enable simultaneous tracing of tasks running in multiple individual address spaces above the operating system. Further, the instrumentation of the operating system object code enables visibility of total system behavior by enabling generation of trace information sufficient to reconstruct address space switches and context switches.

In one embodiment, the instrumentation of the operating system, which can be performed manually or in an automated manner, is coupled to the post compile instrumentation of the target machine's application object code.

In general, the invention enables the generation of trace data with fewer lines of instrumented code by performing the instrumentation on the object code, i.e., post-compile-time. Also, the invention can recognize architecture-specific addressing modes to minimize instrumentation overhead, so that, in many cases, one instruction can be employed to generate trace data for an instrumented block of code. Overhead is also minimized by using the global program view available at link time to avoid instrumenting blocks that can be inferred from other instrumented blocks.

Additional advantages to instrumenting for execution trace at, or after, link time is that it permits trace analysis of object code for which source code is not readily available, such as externally-supplied runtime libraries. Moreover, assembly code modules can be instrumented to generate trace data, an option generally unavailable where instrumentation occurs at or before compile time.

Exemplary Operating Environment

Figure 1A:
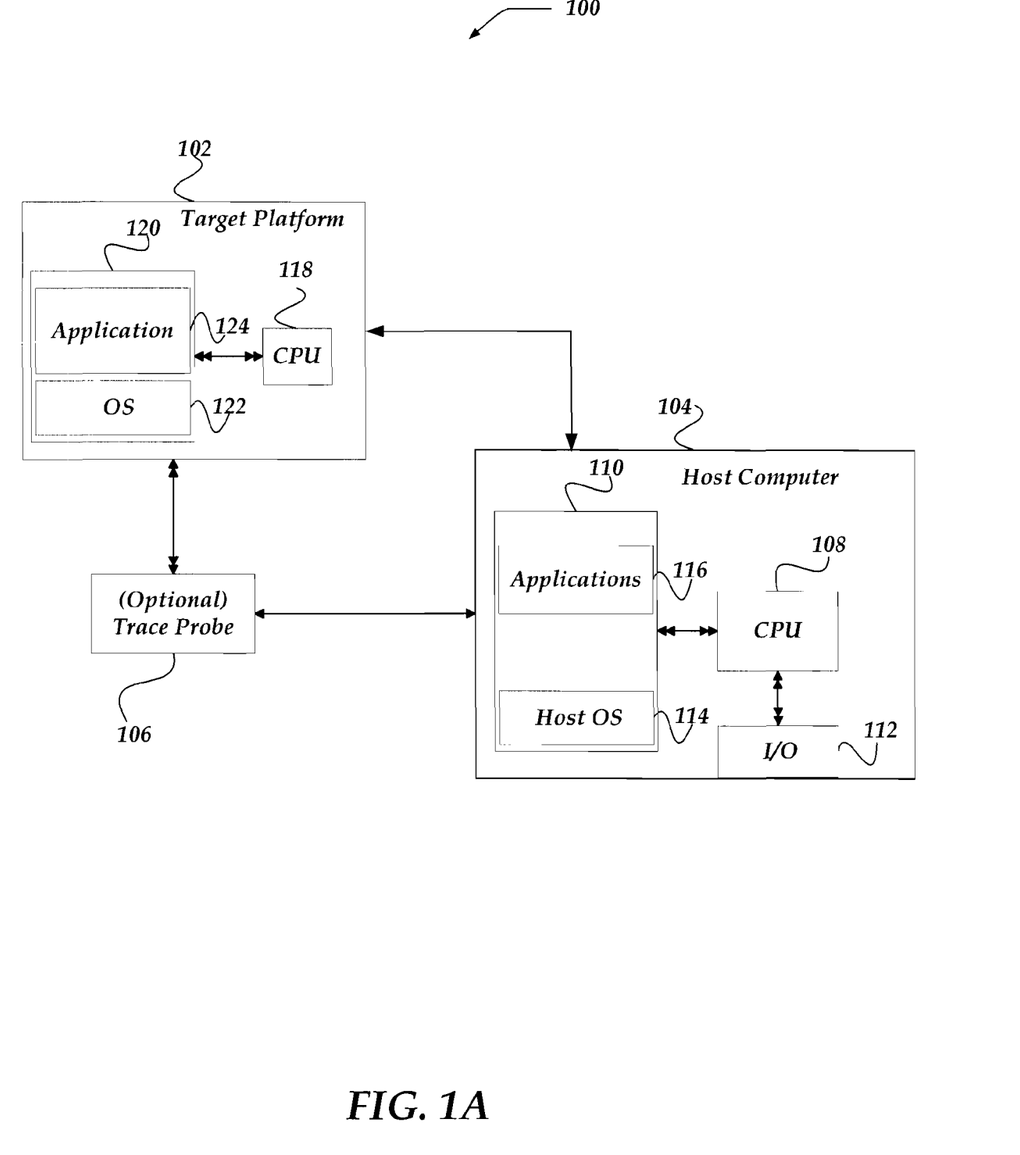
FIG. 1A is a block diagram illustrating an exemplary operating environment.

FIG. 1A illustrates an exemplary operating environment 100 suitable for practicing the present invention. It will be noted that not all the components and features depicted are required to practice the invention, and that variations in the arrangement and type of the components may be made without departing from the spirit or scope of the invention.

FIG. 1A illustrates a operating environment 100 in which the depicted target platform can be an embedded system or the like, although the invention is not thus restricted. Components in environment 100 include target machine 102, host machine 104, and trace probe 106. Software development generally occurs primarily at host machine 104. Host machine 104 can be a general-purpose computing device, such as a workstation, personal computer, emulation terminal, notebook computer, mobile device, and the like. The features of such a computing device are rudimentary to those skilled in the art and as such need not be described at length here. A user interacts with host machine 104, and that host machine includes processor 108 which executes programs loaded in memory 110 and communicates with input and output devices 112. Among the programs that may be executing at certain times are operating system 114 and various applications 116 used in software development, such as, including but not limited to, a compiler, editor, linker, project builder, version control system, debugger, profiler, integrated development environment, and trace analysis software, as well as other applications and processes.

Target machine 102 comprises a platform for which an application program is being developed. It is contemplated that some embodiments of the invention include those in which the target platform includes a microprocessor that does not support hardware trace data generation via a trace port or some other interface. However, the invention may also be employed with a microprocessor that does enable hardware trace data generation.

Target machine 102 and host machine 104 are linked so that executable instrumented code built for target machine 102 can be transferred from host machine 104. This linkage can be a wired or wireless connection. Target machine 102 includes processor 118 and memory 120. As shown in the figure, loaded in memory 120 and at times executed on processor 118 are operating system 122 and application 124. In different embodiments, one or both of the application program 124 and operating system 122 are instrumented in accordance with the invention.

In one embodiment, optional trace probe device 106 is coupled between target machine 102 and host machine 104 by some combination of a wired and/or wireless connection. Trace probe 106 is used to collect and buffer trace data from target machine 102, which executes application 124, and to transmit the collected trace data to host machine 104. The collected trace data is analyzed on host machine 104, for example by way of trace analysis software or other debugging tool, and the execution flow of target machine 102 may thereby be reconstructed and analyzed for debugging and other purposes.

Figure 1B:
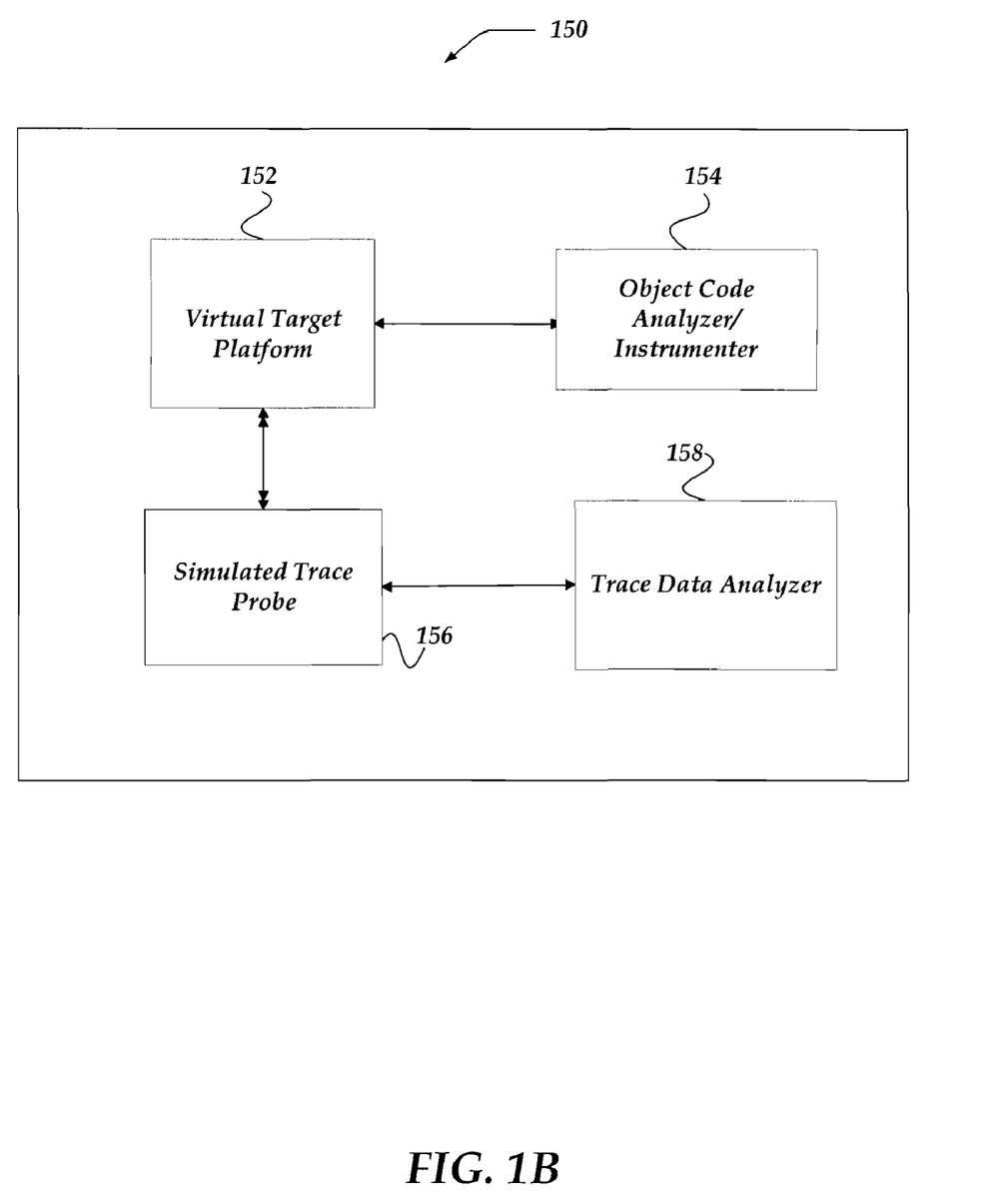
FIG. 1B is a block diagram illustrating a host computer including a virtual target machine.

Exemplary operating environment 100 illustrated in FIG. 1A is neither exhaustive nor limiting, and other embodiments of the invention may be situated within alternative environments. For example, as shown in FIG. 1B, a host machine 150 can include a virtual target machine 152 and/or a simulated trace probe 156. The virtual target machine 152 and the simulated trace probe 156 are virtual machines running on host machine 150 to perform substantially the same actions in substantially the same manner as those discussed above and below. In particular, as depicted in FIG. 1B, object code analyzer/instrumenter facility 154 instruments object code for a program that has been compiled to run on virtual target platform 152. When the instrumented object code is executed on virtual target platform 152, trace data is generated and collected by simulated trace probe 156, from which it is sent for analysis by trace data analyzer 158 or a similar tool.

Figure 1C:
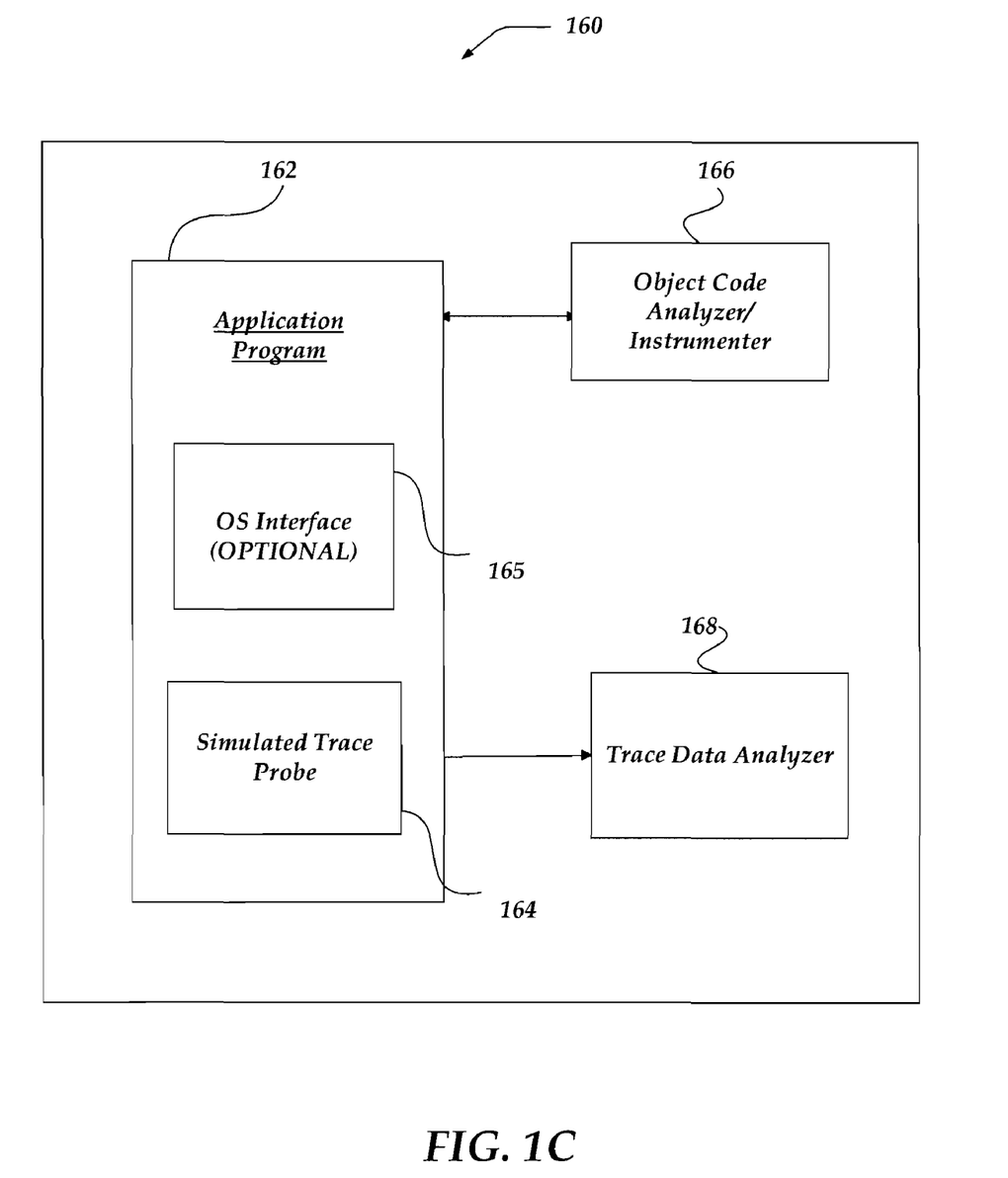
FIG. 1C is a block diagram illustrating a host machine including a program containing a simulated trace probe.

FIG. 1C illustrates host machine 160 that can include application program 162 which is under development for a host or target machine. Application program 162 includes simulated trace probe 164, which integrates the generation and collection of trace data along with the execution of instrumented object code for the application program. Application program 162 can optionally include an operating system (OS) interface 165 for enabling communication with an operating system on the host, target machine, and/or the like.

Object code analyzer/instrumenter facility 166 provides for instrumenting the object code for application program 162 that has been compiled to run on a host or target machine. As the instrumented object code of application program 162 is executed, trace data is generated and collected by simulated trace probe 164 and provided to trace data analyzer 168, or a similar tool. Additionally, in at least one embodiment, the target machine and the host machine can be substantially the same platform.

Figure 1D:
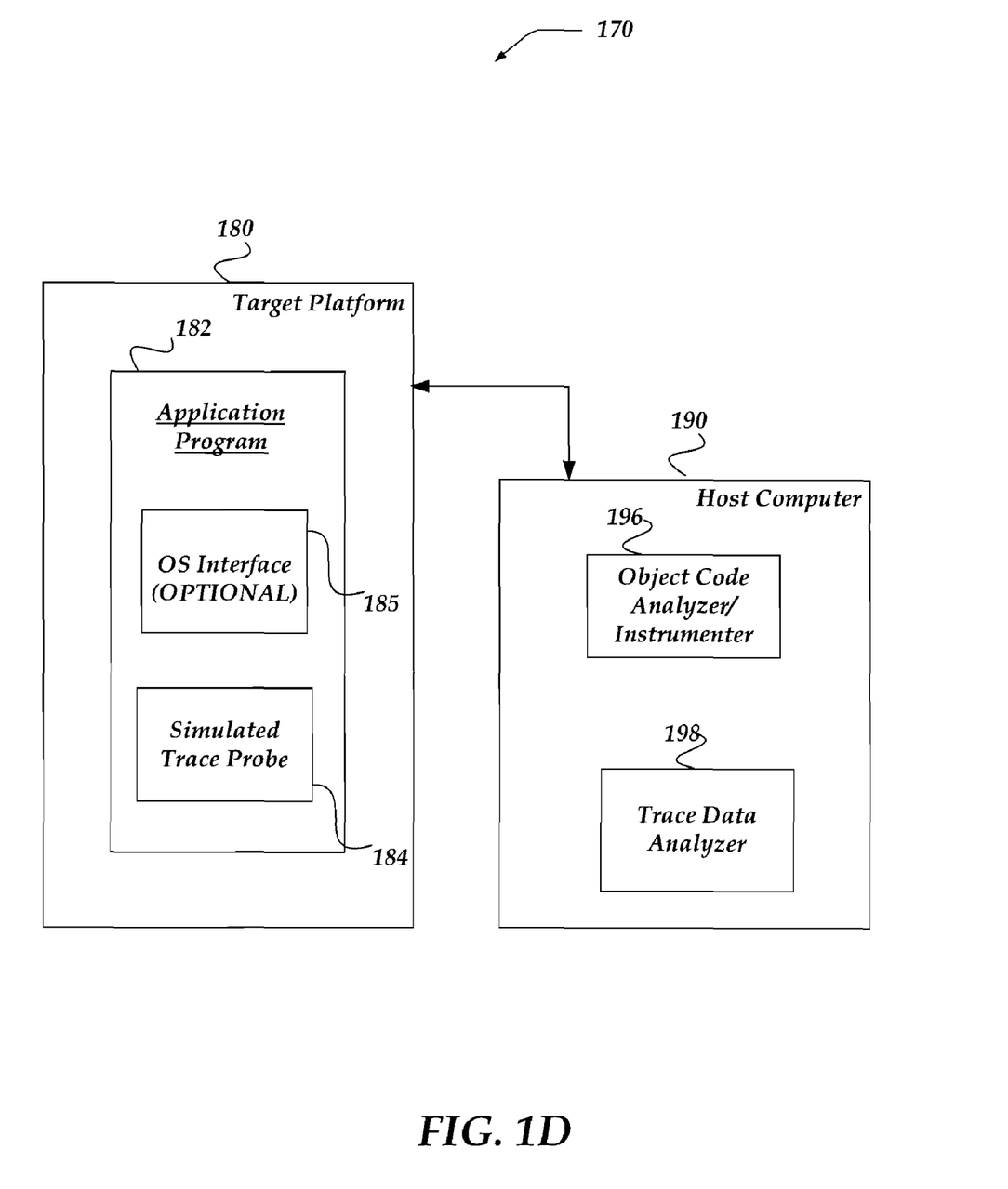
FIG. 1D is a block diagram illustrating in alternative operating environment.
Figure 1E:
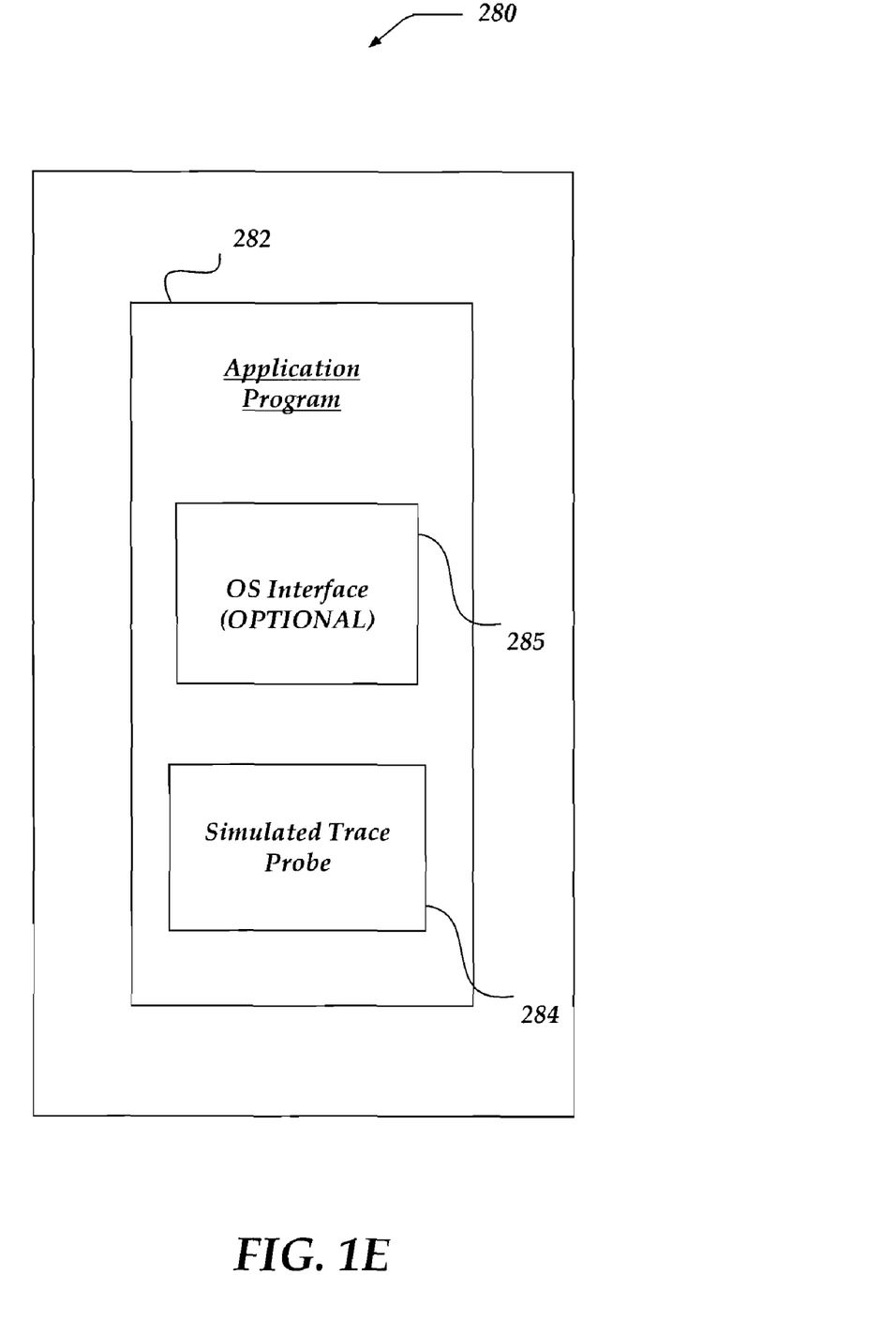
FIG. 1E is a block diagram illustrating a target machine including a program containing a simulated trace probe.

FIG. 1D illustrates an alternative operating environment 170. Target machine 180 and host machine 190 may be linked so that executable instrumented code for target machine 180 can be transferred from host machine 190. As discussed in greater detail below with regard to FIG. 1 E, target machine 180 can include application program 182, which further includes simulated trace probe 184. Additionally, application program 182 can optionally include an operating system (OS) interface 185 for enabling communication with an operating system on the target machine. Additionally, target machine 180 and host machine 190 may be linked so that trace data, generated and collected by simulated trace probe 184, can be sent for analysis to host machine 190. This linkage can be a wired or wireless connection. Host machine 190 can include an object code, analyzer/instrumenter facility 196 and/or a trace data analyzer 198 to perform substantially the same actions in substantially the same manner as those discussed above and below.

FIG. 1E illustrates a target machine 280 that can include application program 282. Application program 282 includes simulated trace probe 284. If application program 282 executes, trace collection takes place within the application program. The encapsulation of simulated trace probe 284, by application program 282, enables application program 282 to generate and/or collect trace data. In at least one embodiment, application program 282 is, therefore, its own simulated trace probe that sends collected trace data to a host machine. Additionally, application program 282 can optionally include an operating system (OS) interface 285 for enabling communication with an operating system on the target machine.

Execution Trace Overview Process

Figure 2:
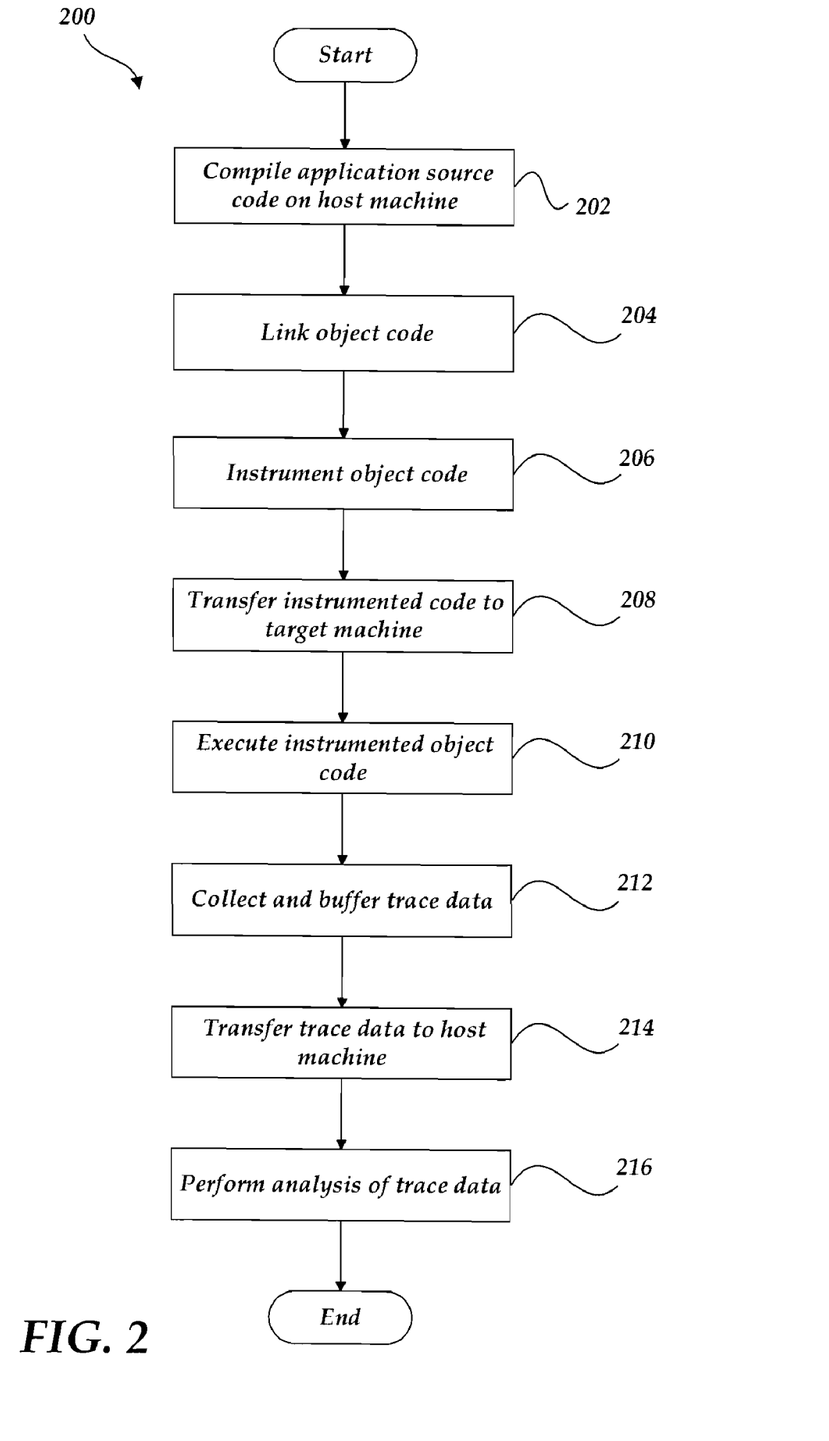
FIG. 2 is a flow diagram illustrating a general overview of a process for instrumenting object code for a target machine.

FIG. 2 is a flow diagram showing an overview of process 200 for debugging an application on a target system, where the process enables automatic instrumentation of the application's object code for the subsequent generation of trace data during run time.

Moving from a start block, the process advances to block 202, at which source code for an application program and/or the operating system for the target platform is written and compiled. Stepping to block 204, the compiled source code, i.e., object code, is linked to various modules that are called by the source code. At block 206, the linked object code is instrumented for trace generation. In one embodiment, the instrumentation is performed at link time by the linker or another facility. In yet another embodiment, the instrumentation is performed by yet another facility after linking.

Next, the process flows to block 208, where the instrumented object code is transferred to the target machine. At block 210 the instrumented object code is executed on the target machine, with trace information generated by way of writes to reserved memory locations. The process then flows to block 212, at which the generated execution trace data is collected and buffered. Next, at block 214, the collected trace data is transferred to the host machine for analysis, and at block 216 the trace data is read by a trace analysis tool, debugger, and the like. The process then returns to performing other actions.

Instrumentation Process

Figure 3:
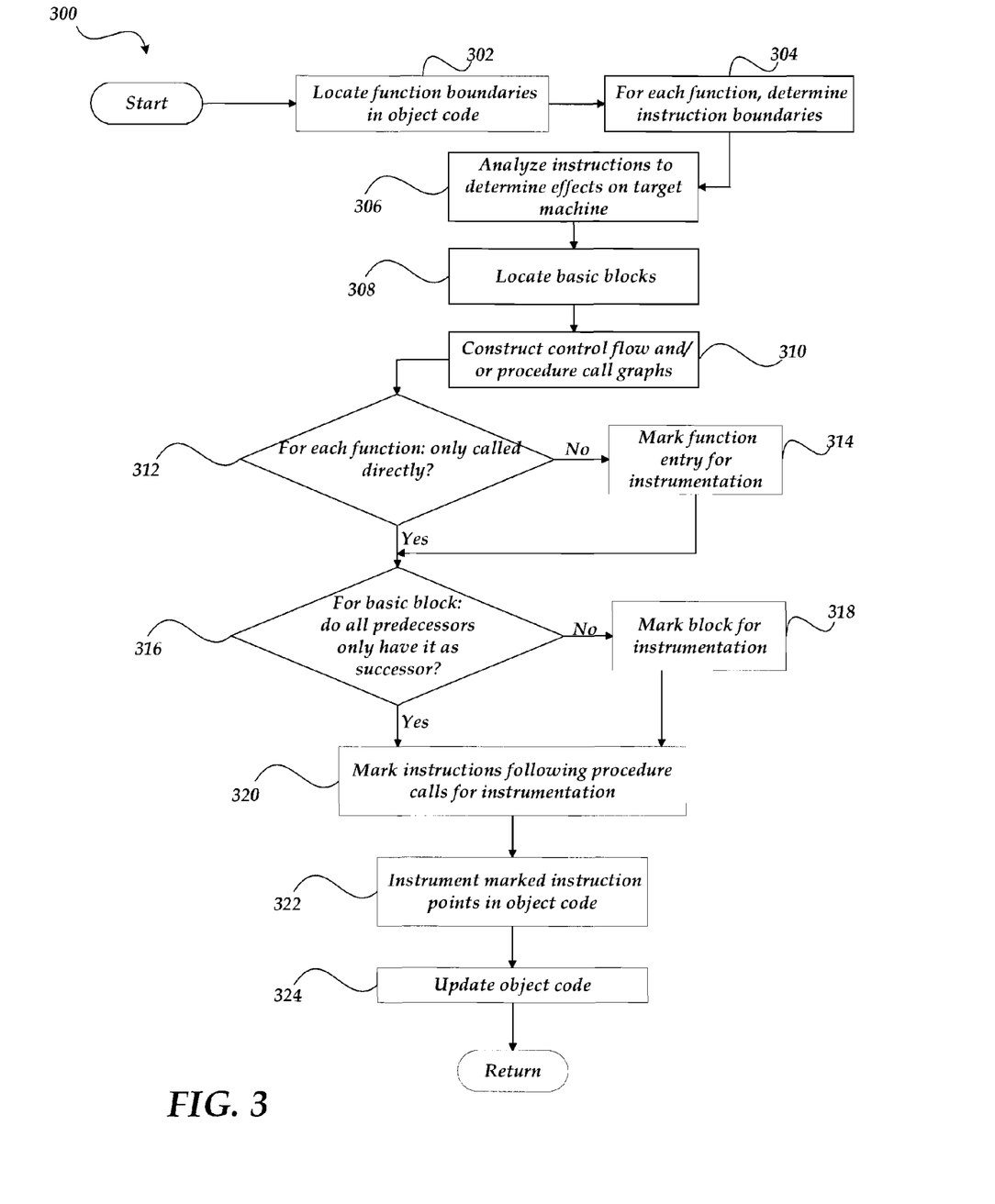
FIG. 3 is a flow diagram illustrating a process for instrumenting application object code for generating trace data.

FIG. 3 is a flow diagram illustrating process 300 for automatically instrumenting application program object code for generating trace data in accordance with the invention. Moving from a start block, the process steps to block 302, where function boundaries in the object code are located. In one embodiment, the symbol table for the object code is employed to determine the location of these boundaries.

Flowing to block 304, the process determines for each function in the object code the instruction boundaries. In one embodiment, the beginning of a function is employed to indicate an entry point, and the object code within the function is disassembled from that point forward. Also, the symbol table and relocation table can be used to determine the instruction boundaries. Additionally, the process detects and avoids non-instruction regions in the code, such as switch statement tables constructed by the compiler, which are typically not instrumented.

Next, the process flows to block 306, at which, within each function, each instruction is analyzed to determine its high-level effects on the target machine: for example, which registers are read, which registers are written to, which instructions are branch instructions and what their target addresses are, and so forth. In one embodiment, a machine-independent model of instructions is used, so that the embodiment is suitable for use in instrumenting code for different architectures. For example, an add instruction for the target machine could be converted into a generic machine-independent add instruction.

Flowing to block 308, the locations of basic block boundaries are determined. The information acquired at block 306 regarding the locations of branch instructions is typically employed in this step. Moving to block 310, at least one of a control flow graph and a procedure call graph are constructed. The control flow graph can be employed to connect the basic blocks. The procedure call graph can be used to connect call points to functions in the code.

Processing next flows to block 312, at which it is determined which function entries need to be instrumented. In some cases, analysis indicates that instrumentation of the first block of a function can be avoided, resulting in an important optimization. At decision block 312, it is determined whether the function is only called directly, which is often the case. If so, then typically the beginning of the function is not instrumented because it can be statically inferred that the first instruction of this function is executed when the function that calls the function executes. Next, the process flows to decision block 316. However, if the relocation table indicated that the address of the function has been taken, signifying that the function may be called by way of a register or function pointer, or if the function is called conditionally, the beginning of the function is instrumented because the function is most likely called indirectly or it cannot be known until runtime whether the function call actually occurs. In this case, processing would flow to block 314. Typically, this kind of analysis and optimization is difficult to attain if instrumentation had been performed at compile time, instead of post-compile. From block 314, the process steps to decision block 316.

At decision block 316, the process determines whether basic blocks require instrumentation. For a given basic block, it is determined whether all of the predecessors of the basic block in the control flow have that basic block as the predecessor's only successor. If true, that basic block isn't instrumented because it is statically known that this basic block is executed if the predecessors execute. Next, the process flows to block 320. Alternatively, if the determination at decision block 316 is false (the basic block is to be instrumented), the process flows to block 318 where the basic block is marked for instrumentation. Next, the process flows to block 320.

At block 320, points in the object code to which control may return after a procedure call (i.e., an instruction that follows a call instruction) are marked as requiring instrumentation. Such instrumentation is employed to reconstruct execution flow from trace data and is required because the return instruction from a function call usually does not include information about where it returns to. The information previously acquired regarding the locations of procedure calls is used.

Moving to block 322, the determined instruction points in the object code are instrumented. Next, processing flows to block 324, at which the object code is updated to enable subsequent execution on the target machine. For example, store-byte instructions for instrumentation are added to the object code. The symbol table is updated and instructions that reference another point in the program are revised, including branch instructions. Switch statement tables and the like are rewritten to reflect changes in the code. Additionally, the object code may be further processed by a linker. Processing then flows to a return block to perform further actions.

Furthermore, in at least one embodiment, during instrumentation of the application program object code, at least portions of a simulated trace probe program may be included in the instrumented code. In still other embodiments, at least portions of a simulated trace probe program may be included before and/or after instrumentation of the application program object code.

Locators for Code Blocks

Figure 4:
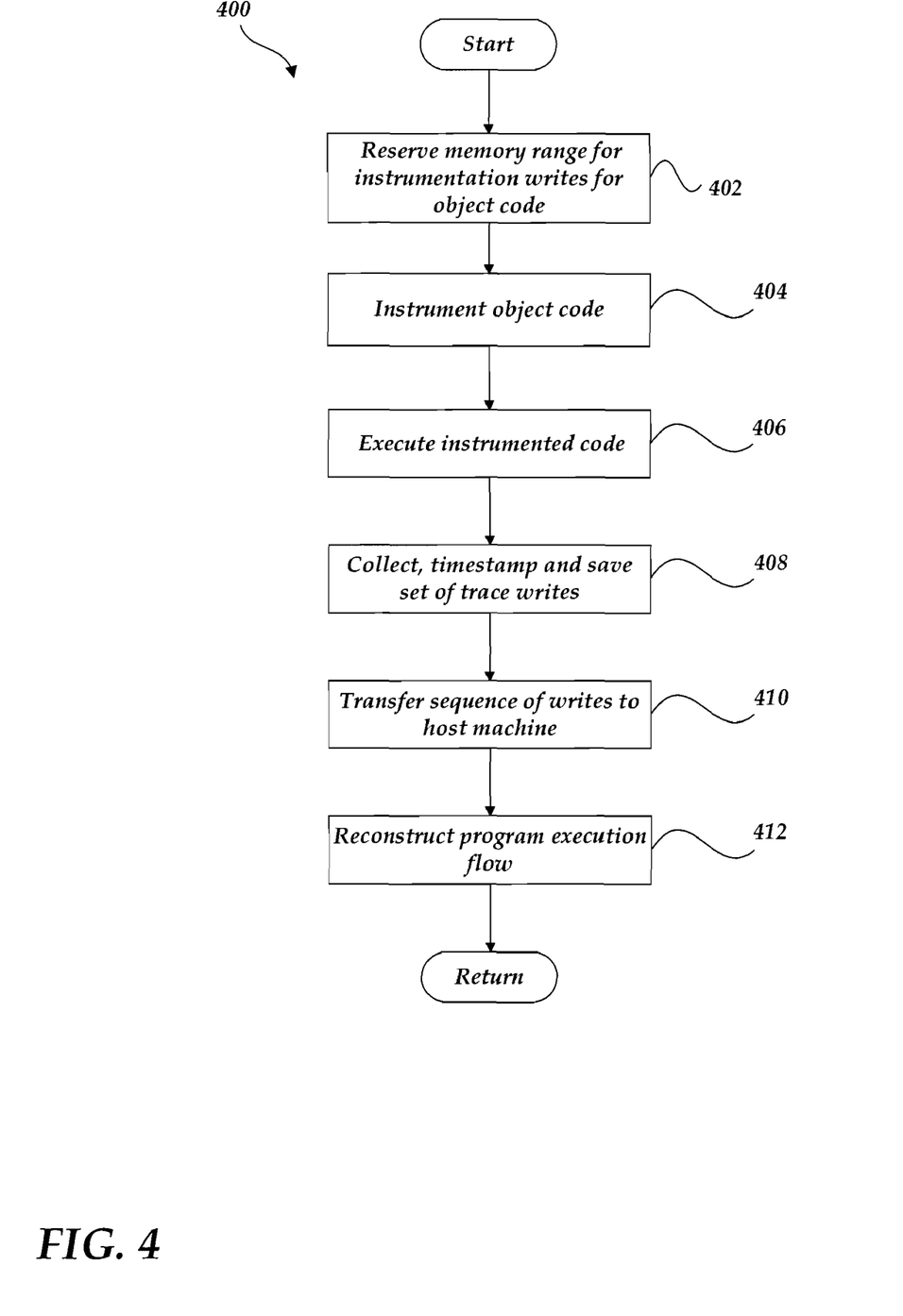
FIG. 4 is a flow diagram illustrating additional details of a process for employing upper memory address locations in the instrumenting of object code for a target machine.

FIG. 4 is a flow diagram of a process for enabling trace generation results from instrumented object code (application and/or operating system object code) to be stored at least temporarily in the upper memory address locations associated with the target machine. Moving from a start block, the process flows to block 402, at which a range of uncached memory locations, such as the upper range of addressable memory, is reserved for writes by the instrumented object code that yield execution trace data. In one embodiment, a trace probe and the target device are configured such that the trace probe appears as this upper range of memory addresses. In another embodiment, this upper range of memory addresses occur on the target machine.

Stepping to block 404, the object code for an application is instrumented in a manner substantially similar to the process disclosed in the discussion of FIG. 3. Each instrumentation point in the object code is thereby associated with a unique memory address serving as a locator for the corresponding instrumented block of object code. Moving forward, at block 406, the instrumented application is executed. Flowing to block 408, the trace probe collects and timestamps the set of trace data writes to the reserved uncached memory address space and saves this trace data to a buffer. At block 410, the collected sequence of saves to this buffer is transferred to a host machine. Advancing to block 412, trace analysis and/or debugging tools and the like can be employed to reconstruct the application's execution flow for offline debugging, visibility, and analysis. Next, the process 400 flows to a return block and returns to performing other actions.

In the past, compile-time instrumentation solutions have stored data values at a special address. Loading such an address typically requires two instructions and loading the data value typically requires two instructions, resulting in considerable overhead in processing the data value. For example, a typical RISC processor with a 32-bit address space typically employs two instructions (or more if a register must be backed up and restored).

However, since some microprocessor architectures-enable specific register-indirect addressing modes, the invention can employ one store instruction to perform substantially the same function for each instrumented basic block. For example, a base register is loaded, and an offset is added to get the final address. On architectures with the aforementioned addressing modes, if a special base register (such as a designated zero register) is specified, the microprocessor can treat it as the number zero rather than actually loading the contents of this register. In this way, addresses at a high range of memory can be accessed with a single instruction.

In some embodiments, n addressing bits may be available for the high address range, but there may be more than $2^n$ blocks to be instrumented in the code. In this case, more than one block can be assigned to a given address. A technique for doing so using, typically, two store instructions can be provided by the invention. Also, one of the available addressing bits can be reserved as a stop bit. When the stop bit is not set, the instruction is not the last store-byte instruction for the current instrumentation point.

For the first $2^n$ instrumentation points, the stop bit in the store instruction is set. For an additional instrumentation point, the stop bit is not set. An additional store instruction is generated. By concatenating the addresses in the two instructions, the instructions provide a 2(n-1)-bit address, allowing $2^{2(n-1)}$ possible instrumentation points. This stop-bit technique can be generalized to accommodate an arbitrarily large number of instrumentation points.

Operating-System-Aware Instrumented Trace

Figure 5:
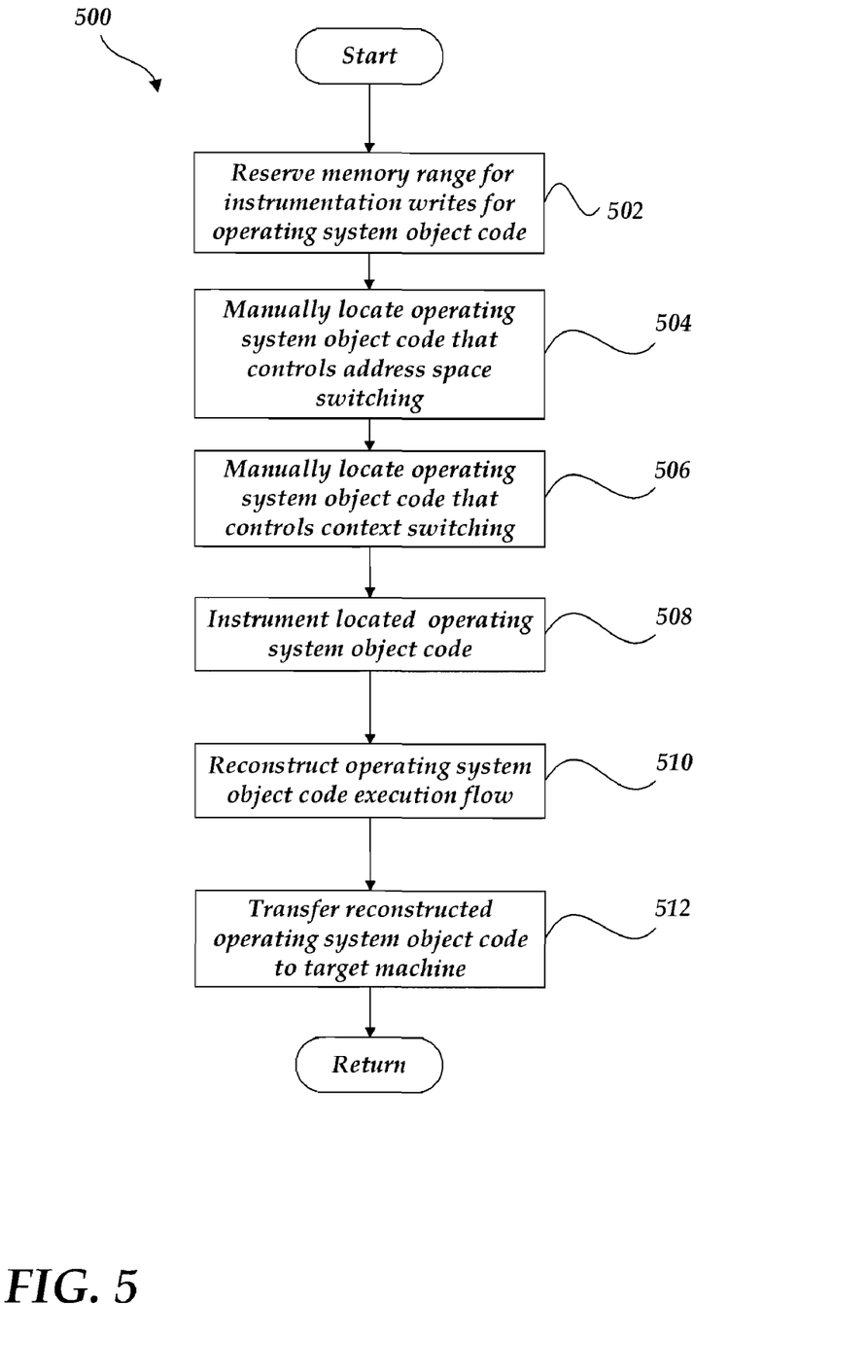
FIG. 5 is a flow diagram for manually instrumenting the operating system object code for a target machine, in accordance with the present invention.

FIG. 5 is a flow diagram illustrating a process for manually instrumenting object code of an operating system for a target machine. Moving from a start block, process 500 flows to block 502, where a range of memory locations is reserved for writes by the instrumented operating system object code. In one embodiment, if the highest range of memory has been reserved separately for writes by instrumentation instructions in instrumented application object code, a range of memory immediately below this highest range may be used for writes by instrumented operating system object code.

Operating system object code is instrumented in such a way that information about the address space and task that is running at a particular time, and information regarding the occurrence of context switches, are made visible. Moving to block 504, the process locates operating system object code that controls address space switching. Next, at block 506, the process locates operating system object code that controls context switching.

Moving to block 508, the regions of operating system object code that were located at blocks 504 and 506 are instrumented. Thus, trace data collection will include address space switch information, and multithreaded application behavior can be reconstructed.

Process 500 next flows to block 510, at which the instrumented operating system object code is reconstructed. Next, at block 512, the instrumented and reconstructed operating system object code is transferred to the target machine, on which it can be loaded and executed. The process then flows to a return block and performs other actions.

Previous approaches to instrumented trace execution have instrumented only a single address space of execution, which is inadequate to facilitate analysis of a multithreaded embedded application running concurrently with a memory-protected operating system and other tasks, each running in different address spaces. To reconstruct system behavior, it is necessary to know not only how individual programs were executed, but also when execution switches from one address space to another and when context switches occur, information that is provided by some hardware trace mechanisms. For processors that do not generate hardware trace data, this capability is provided by the embodiment of the invention described with reference to FIG. 5. Visibility with respect to total system behavior is thereby achieved. The techniques for instrumenting the operating system may be used in combination with, or separately from, the techniques for instrumenting application program object code that have been described above.

The steps for instrumentation of the operating system described above with reference to FIG. 5 may be accomplished manually. Alternatively, the instrumentation can be automated and may be performed, for example, by a linker.

In another aspect of the embodiment, the instrumentation enables trace-based reconstruction of occurrences of interrupts while a task is executing. A technique similar to the stop bit mechanism described above is employed. In the store instructions used at instrumentation points in the operating system, an addressing bit is reserved, with zero indicating that a kernel process is executing and one indicating that a non-kernel task is running in a virtual address space. Thus, if a tag collected as trace data shows the reserved bit set to one, and a subsequent tag shows the bit set to zero, it indicates that an interrupt fired, or a system call trap occurred, or the like, returning control to the kernel. The execution of the program can be reconstructed accordingly.

The store instructions used in the instrumentation again use a reserved address space, as with the instrumentation of application code. In one embodiment, the instrumentation instructions back up a register and then load a unique base address to the register. A subsequent store instruction includes an offset value representing an address space ID or task ID. An additional bit is reserved to indicate whether the value being written out is an address space or task ID.

It will be understood that each block of the flow diagrams discussed above, and combinations of blocks therein, can be implemented by program instructions that can be included as components in a tangible form of processor readable media, such as a CD-RPM, DVD, Tape, Floppy Disc, and the like; or an intangible form of processor readable media, such as an electronic file(s) or electronic component(s). These program instructions may be provided to a processor to produce a machine, such that the instructions, which execute on the processor, create means for implementing the actions specified in the flow diagram block or blocks. The computer program instructions may be executed by a processor to cause a series of operational steps to be performed by the processor to produce a computer-implemented process such that the instructions, which execute on the processor, provide steps for implementing the actions specified in the flow diagram block or blocks.

Accordingly, blocks of the flow diagram illustration support combinations of means for performing the specified actions, combinations of steps for performing the specified actions, and program instruction means for performing the specified actions. It will also be understood that each block of the flow diagram illustration, and combination of blocks in the flow diagram illustration, can be implemented by special-purpose hardware-based systems, and the like, which can perform at least a portion of the specified actions or steps, or combinations of special-purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method executed by a processor for generating execution trace data for a program that executes on a target machine, comprising:
    determining each block of object code for the program to be instrumented, wherein at least one block of object code for the program is instrumented for executing on the target machine; and
    associating an instrumented object code block with a memory location of the target machine, such that, if the instrumented object code block is executed, a simulated trace probe is arranged to collect trace data that is written to the memory location; and
    employing an addressing mode for a target machine architecture for the program to enable the memory location to be accessed with a single instruction.

2. The method of claim 1, wherein at least a portion of the simulated trace probe is encapsulated in the program during instrumentation of the program.

3. The method of claim 1, wherein the program includes the simulated trace probe.

4. The method of claim 3, wherein the target machine comprises the program.

5. The method of Claim 1, wherein the target machine includes an interface for enabling communication with an operating system on the target machine.

6. The method of claim 1, wherein the simulated trace probe is arranged to transfer the collected trace data to a host machine.

7. The method of claim 1, further comprising:
    executing the program on the target machine; and
    employing the simulated trace probe to enable at least one of generation, collection, or communicating the trace data from the instrumented object code block.

8. The method of claim 1, wherein instrumenting the object code block further comprises determining whether it is statically inferable that the first instruction of a function is executed.

9. The method of claim 1, further comprising:
    instrumenting object code for an operating system employed by the target machine with the program.

10. A system having a processor for generating execution trace data for a program, comprising:
    a host machine on which object code for the program is instrumented, wherein an instrumented object code block is associated with a memory location, such that, if the instrumented object code block is executed, data is written to the memory location; and
    a target machine on which the instrumented object code for the program is executed, wherein the program includes a simulated trace probe, such that, if the program is executed, trace data is collected by the simulated trace probe and wherein an addressing mode is employed for the target machine to enable the memory location to be accessed with a single instruction.

11. The system of claim 10, wherein the simulated trace probe communicates the trace data to the host machine.

12. The system of claim 10, wherein the target machine is a virtual machine running on the host machine.

13. The system of claim 10, wherein at least a portion of the simulated trace probe is encapsulated in the program during the instrumentation of the program.

14. The system of claim 10, wherein the simulated trace probe generates at least a portion of the trace data for collection.

15. A non-transitory processor readable medium that includes components for generating execution trace data for a program that executes on a target machine, comprising:
    a first component for determining each block of object code for the program to be instrumented, wherein at least one block of object code for the program is instrumented for executing on the target machine; and
    a second component for associating an instrumented object code block with a memory location of the target machine, such that, if the instrumented object code block is executed, a simulated trace probe is arranged to collect trace data that is written to the memory location; and a third component for employing an addressing mode for a target machine architecture for the program to enable the memory location to be accessed with a single instruction.

16. The non-transitory processor readable medium of claim 15, wherein at least a portion of the simulated trace probe is encapsulated in the program during instrumentation of the program.

17. The non-transitory processor readable medium of claim 15, wherein the program includes the simulated trace probe.

18. The non-transitory processor readable medium of claim 17, wherein the target machine comprises the program.

19. The non-transitory processor readable medium of claim 15, wherein the target machine includes an interface for enabling communication with an operating system on the target machine.

20. The non-transitory processor readable medium of claim 15, wherein the simulated trace probe is arranged to transfer the collected trace data to a host machine.

21. The non-transitory processor readable medium of claim 15, further comprising:
    a fourth component for executing the program on the target machine; and
    a fifth component for employing the simulated trace probe to enable at least one of
    generation, collection, or communicating the trace data from the instrumented object code block.

22. The non-transitory processor readable medium of claim 15, wherein instrumenting the object code block further comprises determining whether it is statically inferable that the first instruction of a function is executed.

23. The non-transitory processor readable medium of claim 15, further comprising:
    a sixth component for instrumenting object code for an operating system employed by the target machine with the program.

* * * * *